United States Patent [19]
Hartman

[11] 3,857,452
[45] Dec. 31, 1974

[54] DUMP TRUCK LOAD-SENSING ASSEMBLY
[75] Inventor: James M. Hartman, Renton, Wash.
[73] Assignee: Tri-Coastal Industries Inc., Seattle, Wash.
[22] Filed: Feb. 14, 1974
[21] Appl. No.: 442,375

[52] U.S. Cl................. 177/139, 177/211, 73/141 A
[51] Int. Cl. ......................... G01g 19/08, G01g 3/14
[58] Field of Search.................... 177/136, 139, 211; 73/141 A

[56] References Cited
UNITED STATES PATENTS
| | | | |
|---|---|---|---|
| 3,499,500 | 3/1970 | Harding | 177/211 X |
| 3,554,025 | 1/1971 | Andersson et al. | 177/211 X |
| 3,695,096 | 10/1972 | Kutsay | 73/141 A X |
| 3,754,610 | 8/1973 | Paelian et al. | 177/211 |

Primary Examiner—George H. Miller, Jr.
Attorney, Agent, or Firm—Graybeal, Barnard, Uhlir & Hughes

[57] ABSTRACT

A load-sensing assembly supports and measures the weight of a container pivotally carried on a vehicle. One end of the container is pivotally mounted to one portion of the vehicle frame by hinge pin means. The other end of the container is mounted to one end of at least one extendible means which in turn is pivotally mounted by hinge pin means to another portion of the frame. The hinge pin means are adapted to measure and carry the entire weight of the container. Each hinge pin means has an outer tubular collar which includes a plurality of cylindrical sections adapted to engage and join in pivotal coupling relationship various load transferring and load receiving members. Integral with and enclosed by the collar is an essentially cylindrical load cell which has longitudinally spaced peripheral land surfaces for engagement with the various cylindrical sections of the tubular collar, and peripheral recessed surfaces intermediate the land surfaces for the purpose of concentrating axial moment stresses at the bottom peripheral portions thereof. Strain gauges are secured to the bottom peripheral portions of the recessed surfaces and have electrical leads connected to external measuring instrumentation. By this arrangement and the orientation of the strain gauges, the weight of the container and any material present therein may be measured by evaluation of the axial moment stresses produced in the load cells.

11 Claims, 5 Drawing Figures

PATENTED DEC 31 1974
3,857,452
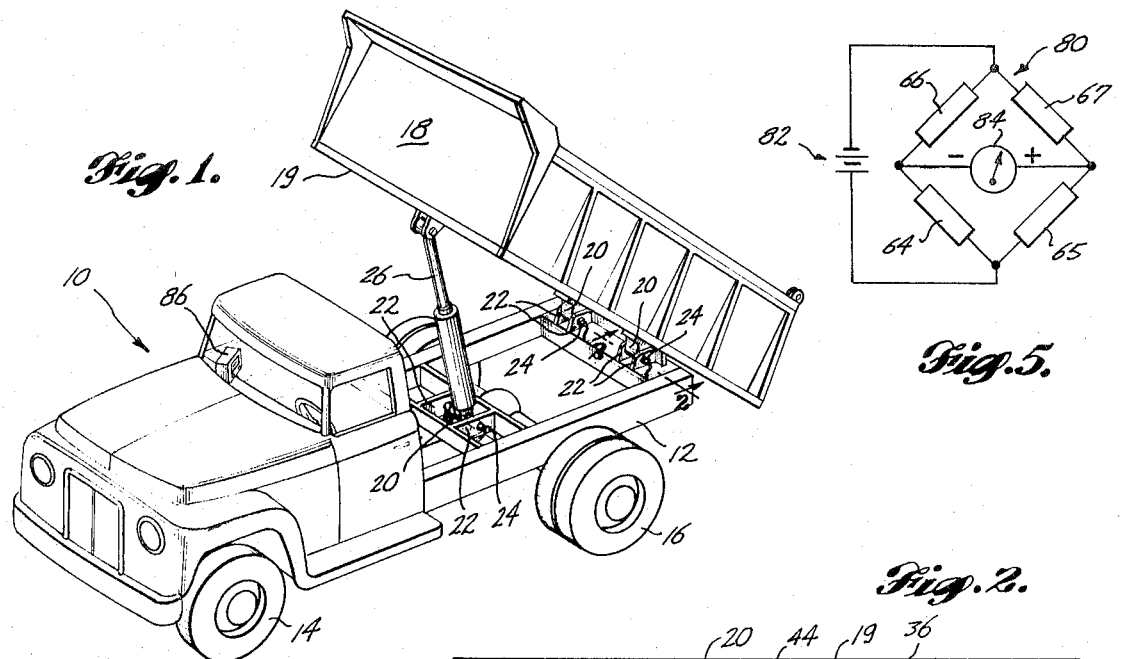
Fig. 1.
Fig. 5.
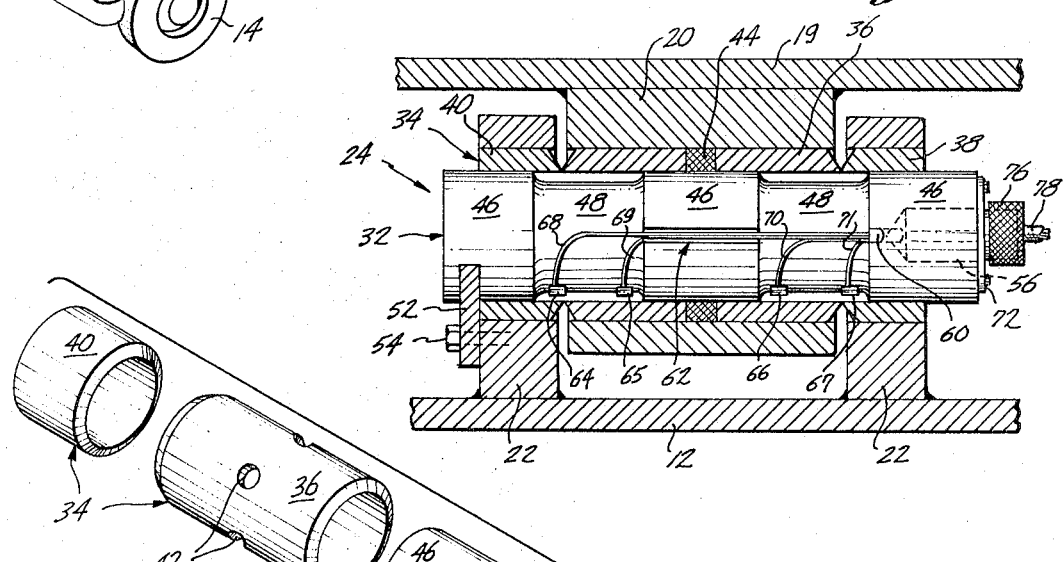
Fig. 2.
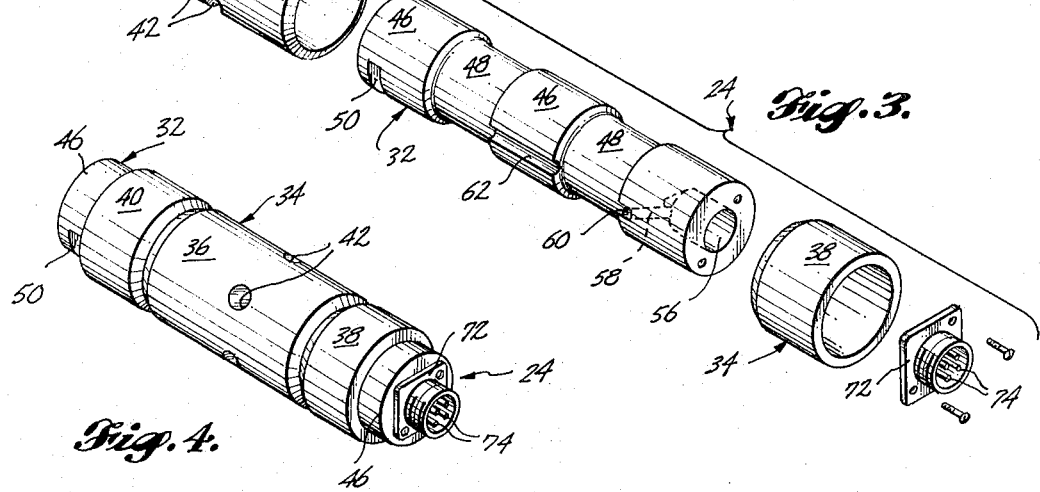
Fig. 3.
Fig. 4.

DUMP TRUCK LOAD-SENSING ASSEMBLY

BACKGROUND OF THE INVENTION

1. Field of the Invention

This invention relates to weight sensing systems for containers carried on a vehicle and more particularly to systems which support and measure the weight of a container which is pivotally mounted on a truck frame. Specifically, this invention relates to a dump truck load-sensing assembly wherein the dump container is pivotally mounted to the truck frame by load-sensing hinge pins.

2. Description of the Prior Art

In vehicles having containers or other objects mounted thereon, it is highly desirable and at times essential that the weight of the container or object be known or determinable at all times. In order to meet this need, various types of devices and systems utilizing strain gauge techniques have been incorporated in such vehicles. Examples of such weight sensing devices for logging trucks, tractor-trailer trucks, farming vehicles and airplanes can be found in U.S. Pat Nos. 3,283,838; 3,322,220; 3,499,500; 3,650,340; 3,661,220 and 3,669,756. In the above patents, however, the strain gauge devices have been mounted either directly on or adjacent to the vehicle axle and do not function as a structural working unit of the vehicle. Additionally, these vehicles do not include pivotally mounted containers. Furthermore, the weight sensing devices disclosed in these patents are complicated, require major structural modifications to the vehicle and are therefore expensive to install.

U.S. Pat. No. 3,695,096 discloses a strain detecting load cell which is interchangeable with a coupling member such as a pin or bolt and includes an axial bore having a plurality of strain gauges mounted therein within zones of sheer concentration to allow simultaneous measurement of both the magnitude and direction of the load. The instant load sensing assembly measures only the magnitude of the load in a vehicle such as a dump truck by measuring the differential axial moment stress resulting from deformation of the bottom portion of the pin due to the weight of the container and materials carried therein.

SUMMARY OF THE INVENTION

The present invention enables one to measure the weight of a pivotally mounted container at the points where the container is supported on the vehicle frame. The hinge pin means utilized by the present invention support the entire weight of the container, provide the means by which the container is pivoted about the vehicle frame, and measure the axial moment stresses at the exterior bottom portions thereof.

Therefore, it is a primary object of the present invention to provide a load-sensing assembly to support and measure the weight of a container which is pivotally carried on a vehicle.

It is another object of the present invention to provide a load-sensing assembly for a dump truck which functions as an integral working unit of the truck.

It is a further object to provide a pin load-sensing apparatus capable of measuring the load between a load transferring member and load receiving members while joining said members in pivotal coupling relationship.

An additional object of the present invention is to provide a pin load-sensing apparatus adapted to replace the hinge pins of a dump truck and capable of measuring axial moment stresses therein resulting from a load imposed thereon.

In accordance with the invention, a material receiving container is mounted on a vehicle frame with the rearward end of the container pivotally secured to the frame by at least one hinge pin. The forward end of the container is mounted to one end of at least one extendible means, preferably a hydraulic lift rod. The other end of the extendible means is pivotally mounted to the vehicle frame by a hinge pin, the extendible means providing the means for pivotally emptying the container. Each hinge pin pivotally couples a load transmitting member to load receiving members, the latter being affixed to the vehicle frame.

Each hinge pin comprises an outer tubular collar integral with and surrounding an essentially cylindrical load cell. The tubular collar preferably comprises a central cylinder having radially inwardly beveled edges and two end cylinders positioned on either side thereof, each end cylinder having a radially inwardly beveled edge abutting a beveled edge of the central cylinder. The central cylinder is adapted to engage a load transferring member while the end cylinders engage load receiving members, the tubular collar thereby joining the load transferring and load receiving members in pivotal coupling relationship.

The cylindrical load cell disposed within the tubular collar preferably includes longitudinally spaced peripheral land surfaces adapted to engage the central and end cylinders of the tubular collar, and peripheral recessed surfaces intermediate the land surfaces and positioned opposite the junctions of the tubular collar's abutting beveled edges. This structure enables axial moment stresses resulting from a load imposed by the load transferring member to be concentrated at the bottom peripheral portions of the peripheral recessed surfaces. Bonded directly to the bottom portion of each peripheral recessed surface is a set of electrical strain gauges, the gauges being arranged and orientated in a manner to enable them to respond to differential axial moment stresses occurring at the bottom peripheral portion of each peripheral recessed surface. The load cell is preferably secured at one end to one of the load receiving members so as to prevent rotation of the load cell. Electrical leads connect the strain gauges to external measuring instrumentation, thereby allowing determination of the weight of the container and any material therein by evaluating the response of the strain gauges to differential axial moment stresses occurring in the load cell.

BRIEF DESCRIPTION OF THE DRAWINGS

FIG. 1 is a perspective view of a typical embodiment of a dump truck equipped with the load-sensing assembly of the present invention;

FIG. 2 is a sectional view taken substantially along line 2—2 of FIG. 1;

FIG. 3 is an exploded perspective view of a typical pin load-sensing apparatus of the present invention;

FIG. 4 is a perspective view of the apparatus shown in FIG. 3 in a fully assembled state; and FIG. 5 is a schematic diagram of a typical Wheatstone bridge circuit employed by the present invention.

DESCRIPTION OF THE PREFERRED EMBODIMENT

Referring to FIG. 1, there is shown a dump truck 10 having a frame 12 mounted on wheel assemblies 14, 16 for movement over a ground surface. Mounted rearwardly above frame 12 is a material receiving container 18 having flat dump bed 19. Secured to the rearward portion of bed 19 are load transmitting members 20, there being at least one and preferably two of said members 20. Affixed to the rearward portion of frame 12 are an equal number of pairs of load receiving members 22, each pair of load receivng members 22 being pivotally coupled to a load transferring member 20 by a hinge pin 24. In preferred form, the two load transmitting members 20 and load receiving members 22 are affixed to bed 19 and frame 12 along an axis which is essentially perpendicular to the longitudinal axis of vehicle frame 12, thereby enabling container 18 to be pivoted rearwardly.

The forward end of bed 19 is secured to at least one extendible means 26 which in its preferred form is a conventional hydraulic lift rod. Extendible means 26 has one end secured to the bed 19 and the other end secured to a load transmitting member 20. Located at the forward end of frame 12 are a pair of load receiving members 22 for each extendible means 26, there preferably being one extendible means 26 with load receiving members 22 being located at the approximate center of frame 12. Members 22 are pivotally coupled to load transmitting member 20 by a hinge pin 24. Extendible means 26 enables the container 18 to be pivoted about the rearward end of frame 12 to empty the contents thereof.

Referring now to FIGS. 2, 3 and 4, there is again illustrated a load transferring member 20 secured to dump container bed 19 and pivotally coupled to load receiving members 22 by hinge pin 24, members 22 being affixed to vehicle frame 12. Hinge pin 24 comprises an essentially cylindrical load cell 32 encased within a tubular collar 34. Tubular collar 34 is composed of a plurality of cylindrical sections. In a preferred form, collar 34 has three sections, a central cylinder 36 and two end cylinders 38, 40. Central cylinder 36 has both longitudinal edges beveled radially inwardly, while each end cylinder 38, 40 has one edge similarly beveled. When tubular collar 34 is fully assembled, the beveled edge of each end cylinder 38, 40 abuts a beveled edge of the central cylinder 36. This structure enables the tubular collar to flex about the abutting beveled edge joints when the hinge pin 24 is deformed by a load imposed thereon through load transferring member 20. This enables stresses resulting from the deformation of pin 24 to be concentrated in load cell 32 while being reduced in tubular collar 34. It also aids in concentrating axial moment stresses at the desired locations in load cell 32 as explained in greater detail below.

Additionally provided about the circumferential center of central cylinder 36 are a plurality of orifices 42 which extend through the entire thickness of cylinder 36. Orifices 42 enable cylinder 36 to be spot welded to the load cell after assembly, weld plugs 44 securing cylinder 36 to load cell 32. It will be understood that any suitable alternative manner of securing cylinder 36 to cell 32, however, may be utilized.

Load cell 32 is an essentially cylindrical solid body which has a plurality of longitudinally spaced peripheral land surfaces 46 separated by recessed peripheral surfaces 48, there being as many land surfaces 46 as there are cylindrical sections in tubular collar 34. Each land surface 46 is adapted to engage one of the cylindrical sections of collar 34. In preferred form, there are three land surfaces 46 separated by two peripheral recessed surfaces 48, the recessed surfaces 48 being positioned radially inwardly of the abutting beveled edge joints in tubular collar 34. By this arrangement, axial moment stresses are concentrated at the bottom peripheral portion of each recessed surface 48 when a vertical load component is applied to load cell 32. In addition, recessed surfaces 48 provide sufficient spacing between collar 34 and cell 32 to place strain gauges on surfaces 48 as described below. In order to prevent rotation of load cell 32, a slot 50 is provided in one of the outermost land surfaces 46 for engagement with a brace 52 which is secured to a load receiving member 22 by bolt 54 or other suitable means.

The major function of collar 34 is to properly distribute the load to cell 32 so as to concentrate axial moment stresses at the bottom portion of recessed surfaces 48 and reduce sheer stress in the side walls of cell 32. Collar 34 also protects the strain gauges and wiring by preventing dirt, moisture, grease and the like from coming into contact with cell 32, a distinct problem with prior weight sensing devices. Additionally, a protective resin coating or the like may be applied over the strain gauges for additional protection.

Preferably provided in cell 32 is an open-ended axial socket 56 which is disposed in the end of cell 32 opposite the end having slot 50 and which communicates with the outer surface of cell 32 through duct 58. The exterior opening 60 of duct 58 is in longitudinal axial alignment with longitudinal groove 62 which extends the length of the intermediate peripheral land surface 46. As explained in greater detail below, groove 62, duct 58 and socket 56 serve as passageways for electrical leads which connect strain gauges to external measuring instrumentation.

In preferred form, the extreme ends of load cell 32 retain some flexibility to move in a vertical plane when cell 32 is deformed by a load. This feature enhances somewhat the concentration of axial moment stresses at the bottom peripheral portions of recessed surfaces 48 while simultaneously reducing the sheer stress in the side walls of load cell 32. However, this feature is not critical to the present invention, and hinge pin 24 will retain its high sensitivity to weight loading regardless of whether such flexibility is present.

Pairs of resistance-type strain gauges 64, 65 and 66, 67 are bonded directly to the bottom peripheral surfaces of recessed surfaces 48. These strain gauges are arranged and orientated along an axis parallel to the longitudinal axis of load cell 32 in such a manner as to respond to longitudinal axial moment stresses at the point of bonding. The axial moment stresses will be due to either tension or compression in the recessed surfaces 48 to which the strain gauges are attached, depending on the degree of flexibility of the ends of load cell 32. Normally, however, they will be due to tension. Distortion of the strain gauge grids due to the axial moment stresses in the surfaces 48 results in a proportionate change in the resistance of the grids.

A pair of leads 68, 69 are secured to strain gauges 64, 65, these gauges being furthermost from socket 56. Leads 68, 69 pass through groove 62 to join with a pair of leads 70, 71 which are attached to gauges 66, 67. All four leads pass through duct 58 into socket 56. Sealing the open end of socket 56 is a plate 72 having four male electrical connections 74, each of which is connected to one of leads 68, 69, 70, 71. When pin 24 is in place and in operation, female connection 76 having electrical wires 78 leading therefrom to external measuring instrumentation engages with male connectors 74. This arrangement enables easy installation of pin 24 and quick replacement thereof when necessary.

Turning now to the operation of hinge pin 24, when a load is transmitted to load cell 32 from load transferring member 20, load cell 32 deforms somewhat and produces axial moment stresses at its bottom peripheral surfaces, especially at the bottom peripheral surfaces of recessed surfaces 48. These stresses are caused by the bending moments of load cell 32. The axial moment stresses occurring at each strain gauge position within a paired set of strain gauges are dissimilar, and these dissimilarities reflect the differences in bending moment at the strain gauge mounting positions. This differential moment between the strain gauges of a pair of gauges is measured in a known way by external instrumentation. U.S. Pat. Nos. 3,365,689 and 3,650,340 include extensive explanations of strain gauge geometry and electric connections as well as bending moment computations, and therefore these details are not repeated herein other than to state that the output signals represents the applied force component multiplied by the distance between the gauges of each set of gauges.

FIG. 5 depicts a Wheatstone bridge network 80 whereby the strain gauges 64, 65, 66 and 67 may be electrically interconnected. The network 80 is energized by a suitable source of electric potential 82, and any unbalance in flow of electric current through the strain gauges of the network due to differential moments and axial moment stresses in the load cell is recorded by an ammeter 84 suitably calibrated to indicate the weight being borne by the load cell 32. Strain gauges are suitably placed on the load cell 32 and interconnected within the network 80 so that the ammeter 84 records only vertical load components which are indicative of the weight of the container 18. The bridge network can be balanced by suitable adjusting means so that ammeter 84 gives a zero readout when the container 18 is empty, and thus any readout on ammeter 84 reflects only the weight of material in container 18. Alternatively, the readout can be adjusted by conventional means to provide total truck and load weight.

Each hinge pin 24 has a separate Wheatstone bridge network as described above, and each network is effective in indicating the weight borne by its associated hinge pin. In the preferred embodiment which utilizes three hinge pins, the output from the three networks are preferably integrated by a suitable summing amplifier, the output of which may be indicated by a suitably calibrated voltmeter. In this manner, the overall weight measurement of container 18 and/or the material therein may be readily determined from a single readout, preferably of the digital type located in the operator's cab as illustrated at 86 in FIG. 1.

The hinge pin apparatus 24 disclosed herein is a simply constructed and easily installed device, yet is highly sensitive to axial moment stress resulting from loads imposed thereon. This provides an easy and inexpensive means for measuring the weight of a pivotally mounted container. Furthermore, the tubular collar, by providing protection for the strain gauges and wiring from dirt, moisture and the like, solves a problem frequently associated with prior weight sensing devices for vehicles such as dump trucks, which frequently come into contact with a great amount of dirt and other foreign material which can interfere with proper strain gauge operation.

In order to determine the weight of material in container 18, the bridge circuits are initially balanced to read zero for an empty container. When the container is in the completely downward position, it rests on the vehicle frame so as not to cause continued and unnecessary loading upon the three hinge pins. When the weight of the material in the container is desired to be known, the container is lifted a slight amount so as to bring the total weight of the container to bear down upon the three hinge pins. In this manner, the weight of the container can be determined at any time the operator of the vehicle so desires, yet the weight-sensing apparatus is not subjected to any undue or unnecessary loading and therefore has a long lifetime of operation.

It will be understood that the invention is not to be limited to the details given herein but that it may be modified within the scope of the appended claims.

What is claimed is:

1. A pin load-sensing apparatus for measuring the load between a load transferring member and load receiving members comprising an essentially cylindrical load cell integral with and surrounded by a tubular collar wherein said tubular collar comprises a plurality of cylindrical sections adapted to engage with and join said load transferring and load receiving members in pivotal coupling relationship, and wherein said essentially cylindrical load cell comprises longitudinally spaced peripheral land surfaces adapted to engage the cylindrical sections of said tubular collar, and peripheral recessed surfaces intermediate said land surfaces and positioned to concentrate axial moment stresses at the bottom peripheral portions of said recessed surfaces when a load is applied to said cell, there being a set of electrical strain gauges operationally bonded directly to the bottom peripheral portion of each of said peripheral recessed surfaces in a manner to enable said gauges to respond to differential axial moment stresses therein resulting from deformation of said load cell due to a loading force being exerted on said load cell by said load transferring member.

2. The apparatus according to claim 1 wherein said tubular collar comprises a central cylinder having radially inwardly beveled edges and adapted to engage said load transferring member, and two end cylinders each having a radially inwardly beveled edge abutting a beveled edge of said central cylinder, each end cylinder being adapted to engage one of said load receiving members, and wherein said load cell comprises three of said land surfaces and two of said peripheral recessed surfaces, said peripheral recessed surfaces being positioned opposite the junction of said tubular collar's abutting beveled edges, the bottom peripheral portion of each of said peripheral recessed surfaces having two electrical strain gauges spaced apart and operationally bonded directly thereto along an axis parallel to the axis of said load cell.

3. The apparatus according to claim 2 wherein said load cell further includes a longitudinal groove extending the length of the intermediate peripheral land surface, an open-ended axial socket disposed within one end of said load cell, a duct connecting said socket with the outer surface of said load cell, a seal fitting covering the axial opening of said socket, said seal fitting having four electrical connection means extending outwardly therefrom, and wires connecting each of said strain gauges to one of said electrical connection means extending from said seal fitting, two of said wires passing through said groove and joining the remaining two wires to pass through said duct into said socket to be connected to said electrical connection means, the end of said load cell opposite the end containing said socket having a notch for attachment to a load receiving member to prevent rotation of said load cell, and wherein said apparatus further includes means for connecting said electrical connection means to the appropriate arms of a bridge circuit, adjustable means for balancing said bridge circuit, means for supplying substantially constant electrical energy to said bridge circuit, and means to meter the response of said strain gauges to a loading force exerted on said load cell by said load transferring member.

4. A load-sensing assembly for supporting and measuring the weight of a container pivotally mounted on a vehicle frame comprising:
- a vehicle frame mounted for movement over a ground surface;
- a container mounted on said frame with one end of said container having at least one load transferring member suspended therefrom which is pivotally secured by hinge pin means to load receiving members affixed to one portion of said frame, and the opposite end of said container attached to at least one extendible means having a load transferring member pivotally mounted by hinge pin means to load receiving members affixed to another portion of said frame, said hinge pin means supporting the entire weight of said container and adapted to measure said weight;
- hinge pin means comprising an essentially cylindrical load cell surrounded by a tubular collar wherein said tubular collar comprises a plurality of cylindrical sections adapted to engage and join said load transferring and load receiving members in pivotal coupling relationship, and wherein said essentially cylindrical load cell comprises longitudinally spaced peripheral land surfaces adapted to engage the cylindrical sections of said tubular collar, and peripheral recessed surfaces intermediate said land surfaces and positioned to concentrate axial moment stresses at the bottom peripheral portions thereof, there being a set of electrical strain gauges operationally bonded directly to the bottom peripheral portion of each of said peripheral recessed surfaces in a manner to enable said gauges to respond to differential axial moment stresses therein resulting from deformation of said load cell;
- means for securing said load cell to prevent rotation thereof; and
- means to meter the response of said gauges to a loading force exerted on said load cell by said container.

5. The assembly according to claim 4 wherein one end of said container has two load transferring members suspended therefrom along an axis which is essentially perpendicular to the longitudinal axis of said frame, each of said load transferring members being pivotally secured by said hinge pin means to load receiving members affixed to the rearward portion of said frame, and wherein the opposite end of said container is attached to one end of an extendible rod, the other end of said rod having a load transferring member pivotally mounted by said hinge pin means to load receiving members affixed to the forward central portion of said frame.

6. The assembly according to claim 4 wherein said tubular collar comprises a central cylinder having radially inwardly beveled edges and adapted to engage a load transferring member, and two end cylinders each having a radially inwardly beveled edge abutting a beveled edge of said central cylinder, each end cylinder being adapted to engage a load receiving member, and wherein said peripheral recessed surfaces are positioned radially inward the junctions of said tubular collar's abutting beveled edges.

7. The assembly according to claim 6 wherein said load cell includes three of said land surfaces separated by two of said peripheral recessed surfaces, the bottom peripheral portion of each of said peripheral recessed surfaces having two electrical strain gauges spaced apart and operationally bonded directly thereto along an axis parallel to the axis of said load cell, and wherein said assembly further includes means for connecting said strain gauges in the appropriate arms of a bridge circuit, adjustable means for balancing said bridge circuit when said container is empty, and means for supplying a substantially constant electrical energy to said bridge circuit.

8. The assembly according to claim 7 wherein said load cell further includes a longitudinal groove extending the length of the intermediate peripheral land surface, an open-ended axial socket disposed within one end of said load cell, a duct connecting said socket with the outer surface of said load cell, and wires secured to said strain gauges, the wires from two of said strain gauges passing through said groove and joining the remaining wires to pass through said duct into said socket for connection to said bridge circuit.

9. The assembly according to claim 8 wherein the end of said load cell opposite the end containing said socket includes a slot for attachment to a load receiving member to prevent rotation of said load cell.

10. A dump truck load-sensing assembly comprising:
- a dump truck frame mounted for movement over a ground surface;
- an open container mounted on said frame with the rearward end of said container having at least one load transferring member suspended therefrom along an axis essentially perpendicular to the longitudinal axis of said frame, each load transferring member being pivotally secured by hinge pin means to load receiving members affixed to the rearward portion of said frame, and the forward end of said container attached to the extendible end of at least one hydraulic lift rod, the other end of each lift rod having a load transferring member pivotally mounted by hinge pin means to load receiving members affixed to the forward portion of said frame, said hinge pin means supporting the entire weight of said open container and adapted to measure said weight;
- hinge pin means comprising an essentially cylindrical load cell integral with and surrounded by a tubular collar wherein said tubular collar comprises a central cylinder having radially inwardly beveled edges and adapted to engage a load transferring member, and two end cylinders each having a radially inwardly beveled edge abutting a beveled edge of said central cylinder, each end cylinder being adapted to engage a load receiving member, said tubular collar joining said load transferring and load receiving members in pivotal coupling relationship, and wherein said essentially cylindrical load cell comprises three longitudinally spaced peripheral land surfaces adapted to engage the central and end cylinders of said tubular collar, and two peripheral recessed surfaces intermediate said land surfaces and positioned radially inwardly the junctions of said tubular collar's abutting beveled edges so as to concentrate axial moment stresses at the bottom peripheral portions of said recessed surfaces, there being two electrical strain gauges spaced apart and operationally bonded directly to the bottom peripheral portion of each of said peripheral recessed surfaces along an axis parallel to the axis of said load cell in a manner to enable said gauges to respond to differential axial moment stresses therein resulting from deformation of said load cell;

means for securing said load cell to prevent rotation thereof;

means for connecting said gauges in the appropriate arms of a bridge circuit;

adjustable means for balancing said bridge circuit when said container is empty;

means for supplying a substantially constant electrical energy to said bridge circuit; and means to meter the response to said bridge circuit to determine the response of said gauges to a loading force exerted on said load cell by said container.

11. The assembly according to claim 10 wherein said load cell further includes a longitudinal groove extending the length of the intermediate peripheral land surface, an open-ended axial socket disposed within one end of said load cell, a duct connecting said socket with the outer surface of said load cell, a seal fitting covering the axial opening of said socket, said seal fitting having four electrical connection means extending outwardly therefrom, and wires connecting each of said strain gauges to one of the electrical connection means extending from said seal fitting, two of said wires passing through said groove and joining the remaining two wires to pass through said duct into said socket to be connected to said electrical connection means, and wherein the end of said load cell opposite the end containing said socket includes a slot for attachment to a load receiving member to prevent rotation of said load cell.

* * * * *